(12) United States Patent
Shealy et al.

(10) Patent No.: US 8,726,792 B2
(45) Date of Patent: May 20, 2014

(54) CHARBROILER AND METHOD OF CHARBROILING

(71) Applicant: CFA Properties, Inc., Wilmington, DE (US)

(72) Inventors: Roger H. Shealy, Fayetteville, GA (US); Dan M. Reep, Peachtree City, GA (US)

(73) Assignee: CFA Properties, Inc., Wilmington, DE (US)

( * ) Notice: Subject to any disclaimer, the term of this patent is extended or adjusted under 35 U.S.C. 154(b) by 0 days.

(21) Appl. No.: 13/644,228

(22) Filed: Oct. 3, 2012

(65) Prior Publication Data

US 2013/0133526 A1     May 30, 2013

Related U.S. Application Data

(63) Continuation of application No. 12/206,430, filed on Sep. 8, 2008.

(60) Provisional application No. 60/971,174, filed on Sep. 10, 2007.

(51) Int. Cl.
    *A47J 37/08*     (2006.01)

(52) U.S. Cl.
    USPC .............................................. 99/389

(58) Field of Classification Search
    USPC ........................... 99/349–351, 326, 389, 353; 219/521–523, 620–627; 426/521–523
    See application file for complete search history.

(56) References Cited

U.S. PATENT DOCUMENTS

| | | | |
|---|---|---|---|
| 3,514,301 A * | 5/1970 | Berger | 99/390 |
| 6,257,126 B1 * | 7/2001 | Veljkovic et al. | 99/349 |
| 2006/0201495 A1 * | 9/2006 | Jones et al. | 126/25 R |
| 2006/0289514 A1 * | 12/2006 | Baumann | 219/729 |

* cited by examiner

*Primary Examiner* — Dana Ross
*Assistant Examiner* — Renee L Miller
(74) *Attorney, Agent, or Firm* — Troutman Sanders LLP; Ryan A. Schneider

(57) ABSTRACT

A charbroiler having both heated grids and at least one radiant heater and a method of charbroiling a food product are disclosed. Each heat source of the charbroiler can be an independently regulated heat source. The independently regulated heat sources can be adjusted to each contribute to the overall cooking of a food product in a cooking cycle. Each of the independently regulated heat sources can be many types of heat sources capable of being regulated either manually or automatically by a cooking control system.

18 Claims, 4 Drawing Sheets

CHARBROILER AND METHOD OF CHARBROILING

CROSS REFERENCE TO RELATED APPLICATION

This application is a continuation of U.S. patent application Ser. No. 12/206,430, filed Sep. 8, 2008, which claims the benefit, under 35 U.S.C. §119(e), from U.S. Provisional Application Ser. No. 60/971,174 filed on Sep. 10, 2007, the entire contents of which are hereby incorporated by reference.

BACKGROUND OF THE INVENTION

1. Field of the Invention

The present invention relates to the field of residential and restaurant class cooking equipment and methods of cooking and, more specifically, the invention relates to charbroilers and charbroiler systems that cook food products simultaneously on both sides using a combination of heated grids and radiant heaters.

2. Description of the Related Art

In the field of commercial cooking, cooking devices need to be able to rapidly cook food products and have high throughput of large quantities of food to meet the needs of a busy kitchen. In commercial cooking, food products are customarily passed through an oven, fryer, or broiler on a conveyor belt. The conveyor belt moves the food product through the oven at an appropriate speed such that the food product is cooked to the desired degree just as it exits the opposite end of the oven, fryer, or broiler. Such cooking devices are used in fast food restaurants and the like, for example. In such an apparatus, successive servings of meats and fowl such as hamburgers, chicken parts and similar food products are cooked in a continuous production line.

Conventional chain broilers may utilize a conveyor chain that suspends the food products between upper and lower heaters. The food product is placed on the conveyor chain, and the conveyor moves the food product through the cooking chamber, where the product is heated by the elements above and below the product.

Yet, conventional chain broilers and clamshell over-broilers are disadvantageous, as they can only produce a food product with a grilled bottom and a broiled top—as conventional commercial conveyor systems provide no grill markings on top.

Additionally, electric grills are available with solid cooking surfaces both above and below the food product, for example, grills comprise solid plates of metal or coated metal that are used to press food products there between to cook them. The Taylor® QS Series of clamshell grills and the George Foreman® grill for home use are examples of this technology.

For example, US Patent Publication No. 2006/0289514 to Baumann discloses a clamshell top platen grill with under microwave. Yet, Baumann is silent as to a charbroiling process, nor can it perform the charbroiling process. Charbroiling involves underheat passing through a lower grate supporting food product, wherein the underheat both heats the grate supporting the food (providing grill marks), and allows radiant and convective heat to pass through the openings in the grate to brown and otherwise assist in cooking the food product not in contact with the grates. The Baumann device is not a charbroiler at all, but instead a hybrid microwave and solid grill.

Other known cooking systems employ grills with a bottom grilling surface with clamshell over broilers. Additionally, there are radiant heaters for grilling the bottom surface of the food product or broiling the top surface.

Further, the cooking process of traditional charbroilers/grills is highly variable due to the potential for variability of heat added to the food product by the grid. For example, if a grill has been sitting idle for some time, the grid may be excessively hot and burn the food product when placed on it. On the other hand, if a first cooking cycle has just ended and a food product has just been removed from the grid and another food product is subsequently put immediately onto the grate, the grate may not have recovered to the target initial temperature, and therefore may not mark the product, take longer to cook the food product, and/or cause the food product to undesirably stick to the grid.

Therefore, it can be seen that a need yet exists for a charbroiling system that charbroils food products simultaneously on both sides.

BRIEF SUMMARY OF THE INVENTION

The present invention is preferably a food grilling surface. The food grilling surface of the present invention comprises preferable characteristics, and can used as a component in a cooking appliance. An exemplary grilling surface can be incorporated into a charbroiler comprising an upper grilling surface, and a lower heated grilling grate comprising a plurality of thermally conductive members, at least a portion of the conductive members heated by an embedded heat source running at least approximately parallel with the conductive members.

The charbroiler can further comprise an upper radiant heater positioned above the upper grilling surface, and a lower radiant heater positioned below the lower heated grilling grate to provide radiant heat between the conductive members of the lower heated grilling grate.

The upper heated grilling surface, the lower heated grilling grate, the upper radiant heater, and the lower radiant heater can each comprise an independently regulated heat source.

An exemplary food grilling surface also can be incorporated into a charbroiler comprising an upper grilling surface and a lower heated grilling grate comprising a plurality of thermally conductive members, at least a portion of the conductive members heated by embedded electric resistive heating running at least approximately parallel with the conductive members. The electric resistive heating can located fully within the at least a portion of the conductive members of the lower heated grilling grate. The upper grilling surface and the lower heated grilling grate can each comprise an independently regulated heat source.

The charbroiler can further comprise a cooking control system for controlling the temperature of the upper grilling surface and the lower heated grilling grate, and the cooking control system can operate based upon pre-programmed cooking cycles. The cooking control system can provide dynamic control of a cooking cycle based upon user input or input from various sensors built into the charbroiler. The cooking control can determine a cooking factor for one or both of the upper grilling surface and the lower heated grilling grate.

Another exemplary food grilling surface can be incorporated into a clamshell charbroiler for cooking a food product comprising an upper heated grilling grate comprising multiple thermally conductive members located on a common plane, the conductive members creating grilling marks on an upper surface of a food product, a lower heated grilling grate comprising multiple thermally conductive members located on a common plane, the conductive members heated by embedded electric resistive heating and creating grilling marks on a lower surface of the food product, an upper radiant heater positioned above the upper heated grilling grate to provide radiant heat between the thermally conductive members of the upper heated grilling grate to assist in browning the food product, and a lower radiant heater positioned below the lower heated grilling grate to provide radiant heat between the thermally conductive members of the lower heated grilling grate to assist in browning the food product, wherein the upper heated grilling grate, the lower heated grilling grate, the upper radiant heater, and the lower radiant heater each comprise an independently regulated heat source.

The charbroiler preferably creates grilling marks on the upper and lower surfaces of the food product simultaneously, while also simultaneously browning the food product between the thermally conductive members of the heated grilling grates. The radiant heaters can further provide convective heat, the convective and radiant heat from the radiant heaters assisting to cook and brown the food product.

The heat output of any one of the independently regulated heat sources can be adjustable based upon the temperature of any of the other independently regulated heat sources. The cooking time of the food product can be based upon the temperature of the independently regulated heat sources.

The charbroiler can further comprise an upper section comprising the upper radiant heater, and a lower section comprising the lower radiant heater, wherein the upper section is hinged to the lower section.

The grilling grates can comprise a material selected from the group consisting of cast iron, aluminum, stainless steel, ceramics, and combinations thereof. The grilling grates can comprise a coating.

The electric resistive heating can be at least partially inside at least a portion of the lower heated grilling grate. The electric resistive heating can be located fully within at least a portion of the lower heated grilling grate.

In another exemplary embodiment, the present invention is directed to a charbroiler comprising an upper heated grid, a lower heated grid, and at least one radiant heater. In certain embodiments, either or both of the upper heated grid and lower heated grid are internally heated. Grids of conventional charbroilers or gas grills are normally heated as a byproduct of radiant heaters positioned behind them, in such cases, the radiant heat is regulated in an attempt to achieve good browning of the product between the grates as well as to heat the grates themselves.

Embodiments of the charbroiler of the present invention can further comprise an upper radiant heater and a lower radiant heater. In a preferred embodiment, each of the lower heated grid, the upper heated grid, the upper radiant heater, and the lower radiant heater each comprise an independently regulated heat source. The independently regulated heat sources can be adjusted to each contribute to the overall cooking of a food product in a cooking cycle. Each of the independently regulated heat sources can be many types of heat sources capable of being regulated either manually or automatically by a cooking control system, such as, but not limited to, an electrical heat source, an infrared heat source, a microwave heat source, gas fired heat source, or combinations thereof. The charbroiler can additionally comprise independent temperature sensors for directly or indirectly sensing the temperature of one or more of the upper heated grid, the lower heated grid, the upper radiant heater, and the lower radiant heater to monitor their temperatures.

As used herein, the terms "upper" and "lower" are used generally to denote that the components, for example the upper and lower radiant heaters, are on opposite sides of a cooking chamber. The "upper" and "lower" components can actually be to the right and left of the cooking chamber or can be positioned at an angle from the horizontal position. As such, even though the terms "upper" and "lower" are used throughout, the components described are not necessarily above or below one another.

As used herein, the terms "grids" and "grate" refer to a support for a food product that has parallel, intersecting, or crossed members that support a food product. The members can have many cross-sectional shapes and can be many sizes that do not block radiant heat from the opposite side of grid or grate from directly cooking the food product.

Further embodiments of the invention are directed to a method of cooking a food product. Such embodiments include a method of cooking comprising adjusting the heat output of at least one independently regulated heat source based upon the input of a temperature sensor indicating the temperature of a different independently regulated heat source. The method can further comprise monitoring a cooking factor of each independently controlled heat source by monitoring a temperature of the independently regulated heat source to balance the cooking factors and to cook the food product to the desired degree.

The food grilling surface of the present invention comprises one or more of the following characteristics used as a component in a cooking appliance: it supports and/or presses food product to provide grill marks and conduct heat to the food product; grilling members maintain adequate air spaces between independent members or adequate air spaces in the construction of a grate or structurally connected grilling members to allow air convection and/or infrared radiation to pass between the spaced grilling members and onto and around the food product being cooked; grilling members are constructed of metal, ceramic, metal alloy, or combination thereof and heated by one or a combination of the following methods—electric heating element(s) wholly or partially embedded inside the grilling members or inductive heating from an electromagnetic induction source in close proximity to the grilling members; and grilling members may employ a temperature sensor(s) located inside of, on the surface of, or external to the grilling members to provide temperature feedback to host appliance's temperature control mechanism.

The food grilling surface of the present invention is configured, for example, by combining multiple grilling members into a grate, and/or as a linked chain or conveyor of grilling members. The grilling surface can be duplicated to supply opposing grilling surfaces to cook both sides of a food product simultaneously. The grilling surface supplies opposing grilling surfaces to cook both sides of a food product simultaneously In an exemplary embodiment, the present invention is patentably distinct over, for example, the Baumann apparatus for cooking food products on both sides thereof. As disclosed, there are many conventional clamshell grills, and while the concept of cooking from both sides is known, the claimed system of "charbroiling" food product from two sides, simultaneously, is novel and non-obvious. Charbroiling involves underheat passing through a lower grate supporting food product, wherein the underheat both heats the grate supporting the food (providing grill marks), and allows radiant and convective heat to pass through the openings in the grate to brown and otherwise assist in cooking the food product not in contact with the grates. The claimed grids or grates allow for the heat to pass through the openings.

The Baumann device cannot provide the presently claimed system of charbroiling food product from two sides, simultaneously. Baumann discloses a clamshell device that employs microwave heating on the bottom and presumably a solid metal platen on the top. The Baumann device is not a charbroiler at all, but instead a hybrid microwave and solid grill. The presently claimed invention incorporates non-solid clamshell grilling grids to create a clamshell charbroiler patentably distinct form Baumann's microwave/grill. The present charbroiler uses heated grids (necessarily with spaces) to allow for convection and radiated energy to pass therethrough, as opposed to a solid metal platen or microwave platform as known devices, use, including Baumann.

Accordingly, one object of the present invention is to provide a charbroiler that cooks and leaves grill marks on both sides of a food product simultaneously while also simultaneously browning the spaces between the grids with radiant heat.

A further object of the present invention is to provide a charbroiler that allows the opposing cooking surfaces to cook in an approximate parallel position one to another, while allowing for setting a gap between the two grids, controlling the contact, or lack thereof, between the upper heated grid and the food product's top surface.

Another object of the present invention is to provide a charbroiler that provides temperature control of the heated grids independent from a radiant heat source.

Yet another object of the present invention is to provide a charbroiler that can also operate as an over broiler (no or low heat on the bottom, high heat from the top), or a combination charbroiler/over broiler, or a single-sided charbroiler, for example, providing high heat on the bottom of the food product with no or low heat on the top of the food product, or with an upper section of the charbroiler moved out of proximity of the food product being cooked, and heat provided to the food product from a lower section of the charbroiler resulting in cooking similar to that of a traditional charbroiler.

Another object of the present invention is to provide a method of dynamically modifying cooking time to compensate for variances between the desired target temperatures and actual temperatures measured in the cooking apparatus at various locations. This compensation can result from monitoring the heated grid(s) and/or the radiant heater(s) performance relative to desired temperatures or other settings.

A further object of the present invention is to provide a method of dynamically modifying cooking grate temperatures and radiant heater temperatures throughout the cook cycle to provide a desired degree of cooking of a food product as to various characteristics, including markings, tenderness, internal temperature, and juiciness.

Yet another object of the present invention is to provide a cooking device having radiant heaters and heated grids temperatures that are sensed, and temperatures manipulated, such that all radiant heaters and heated grids contribute approximately a desired amount, cooking factor, to the food product.

A further object of the present invention is to provide a method of dynamically compensating cooking time (in real-time) throughout the entire cooking process based according to a non-linear algorithm utilizing accumulated cooking factors of key cooking components.

These and other objects, features and advantages of the present invention will become more apparent upon reading the following specification in conjunction with the accompanying drawing figures.

DETAILED DESCRIPTION OF PREFERRED EMBODIMENTS

Figure 1:
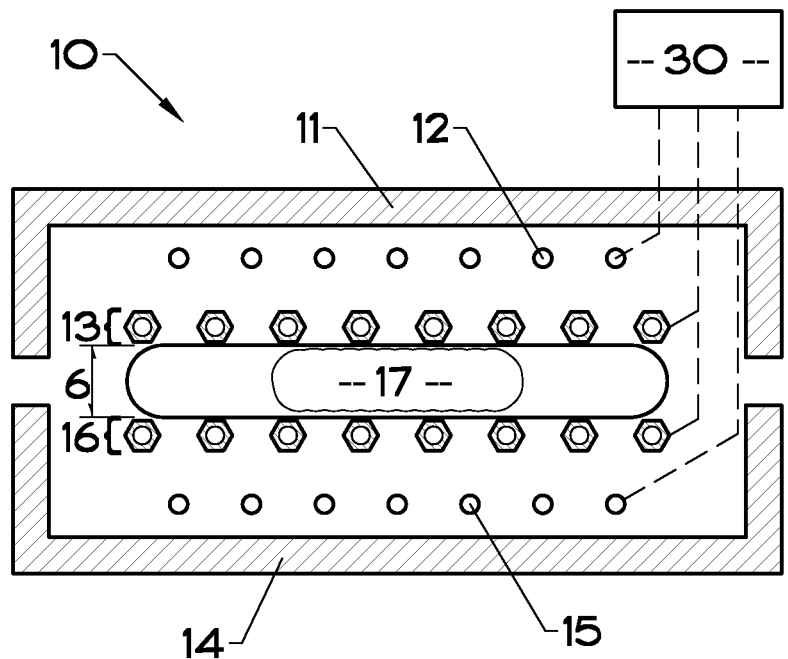
FIG. 1 illustrates a cross-sectional view of the present invention, according to a preferred embodiment.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Briefly described, in preferred form, an embodiment of the charbroiler of the present invention is a means for charbroiling food products simultaneously on both sides using a combination of upper and lower heated grids and upper and lower radiant heaters. As used herein, the terms "charbroiler" and "grill" will be used interchangeably, as either can refer to a device with hot cooking grates or grids that allow radiant heat from a heat source behind the grate to radiate onto food products placed on the cooking grate.

The present invention provides a grilled appearance on both sides of a food product at the same time, thus avoiding having to flip the food product over as is the common practice on a typical charbroilers and grills that only heats a food product from one side. This improves both operational efficiency and provides more consistent internal food temperatures by pressing food products to a more uniform thickness.

In a preferred embodiment of the present invention, as shown in FIG. 1, the lower and upper heated grids have the ability to be heated internally and independent of radiant heaters. In one embodiment, the internal heating is achieved by a heat source either embedded or in contact with the grids or through induction methods common in the food industry wherein a ferrous metal is heated by manipulating the magnetic polarity near the ferrous material to produce heat in a metal, for example.

An embodiment of the invention is directed to a charbroiler or grill comprising an upper heated grid, a lower heated grid, an upper radiant heater, and a lower radiant heater. As shown in FIG. 1, the charbroiler 10 can comprise a upper section 11 attached to a lower section 14 wherein the upper section 11 can comprise the upper radiant heater 12 and the upper heated grid 13 and the lower section 14 can comprise the lower radiant heater 15 and the lower heated grid 16. The upper section 11 can be attached to the lower section 14 by many attachment schemes that allow the upper section to be manipulated from a closed position (as shown in FIG. 1) to an open position such as, but not limited to, a hinge, a sliding hinge, threaded rods, or other attachment members, such as in clamshell grills or griddles. The charbroiler of FIG. 1 is shown with one food product 17; embodiments of the charbroiler of the present invention can be sized to cook multiple food products simultaneously or can include multiple sets of independently controlled heated grids and radiant heaters.

In a preferred embodiment, the two-sided grill of the present invention hinges the upper section over the lower section so the upper section rises off the lower section in a "clamshell" fashion. Alternatively, the upper section can be manufactured to raise straight up or swivel to the side to provide access to load and unload food products onto the lower section.

It can be advantageous to turn off the radiant heaters on the upper section in order to make loading and unloading product, and cleaning the cooking surfaces, safer and more pleasant for the operator, or to save energy. In such cases, it can be desirable to control the grid surfaces to a particular temperature to promote marking and reduce sticking of product to the grates when the next batch is loaded. In essence, the heated grids can remain at or near their operating temperature even though the heat source for the radiant heaters is reduced or cycled off.

In other embodiments, each of the upper section and the lower section can be attached to a base or other support structure by an attachment member in such a manner as to allow the charbroiler to be manipulated from a closed position to an open position. The open position allows food to be placed on the lower heated grid 16 and facilitates cleaning of the charbroiler. In the closed position the attachment member can allow the upper heated grid and the lower heated grid to be held substantially parallel to each other, or allow the upper grid and the lower heated grid to be non-parallel to each other.

In a further embodiment of the charbroiler, the charbroiler can be a clamshell charboiler comprising an upper radiant heater and a lower radiant heater. In certain embodiments, the clamshell charboiler will comprise grates that are not independently heated but are heated indirectly from the radiant heaters. The clamshell charbroiler can further comprise an upper section comprising the upper radiant heater and a lower section comprising the lower radiant heater. The clamshell charbroiler can be many styles of clamshell grill as described herein, such as, for example, a clamshell charbroiler wherein the upper section is hinged to the bottom section.

Figure 2:
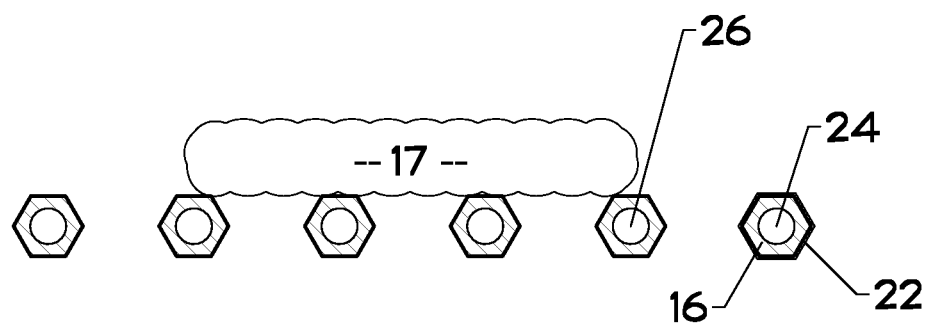
FIG. 2 illustrates a cross-sectional view of a grilling surface with a fully embedded heat source in at least a portion of the grilling members of the grilling surface.
Figure 3:
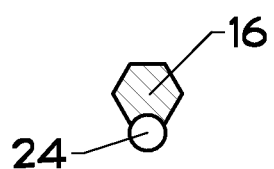
FIG. 3 illustrates a cross-sectional view of a grilling surface with a partially embedded heat source in a grilling member of the grilling surface.
Figure 4:
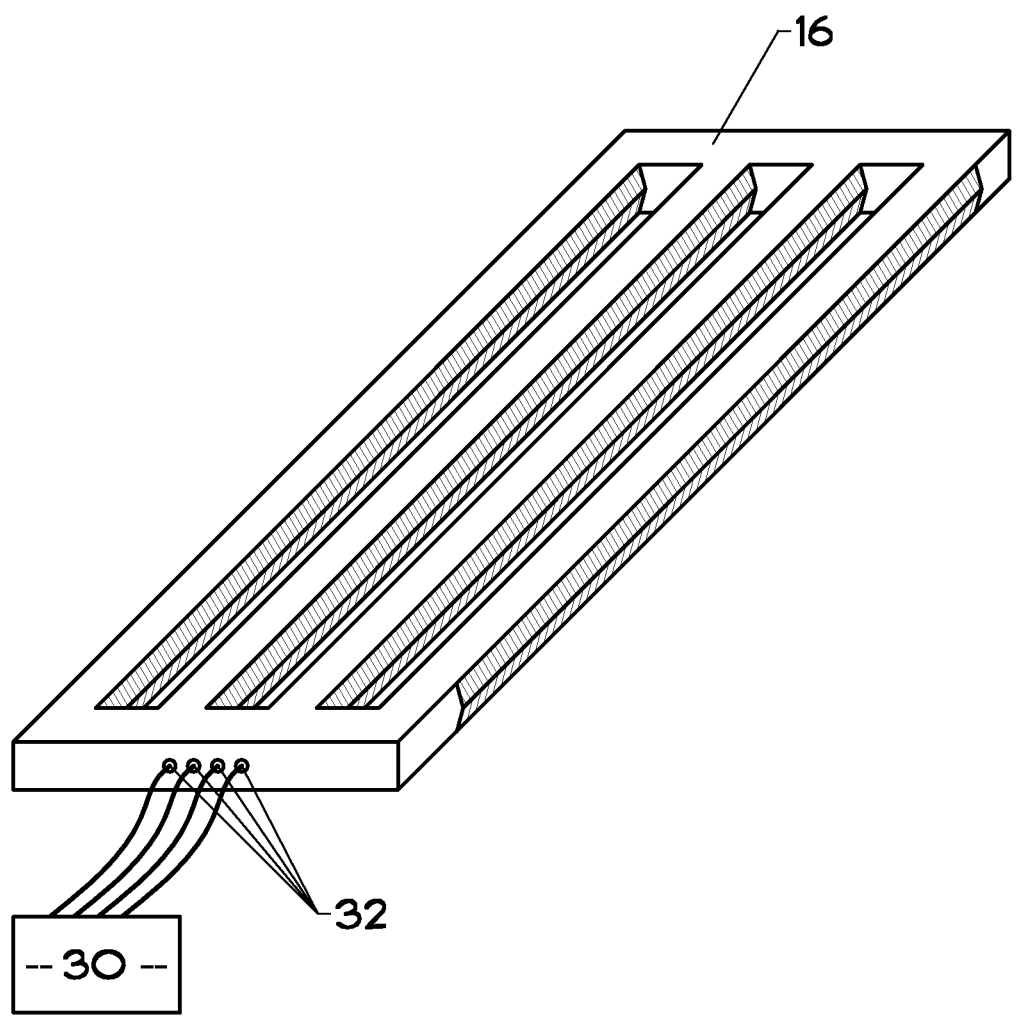
FIG. 4 illustrates a perspective view of a grilling surface with a control system and temperature sensors.

Embodiments of the charboiler can be made of appropriate materials or combination of materials, for example, the housing can be made of a thermally stable plastic that is able to withstand the cooking temperatures, metals such as stainless steel, or other composites. The grids can be constructed of cast iron, aluminum, stainless steels, other metals and metal alloys, ceramics, or combinations thereof, any of which can optionally comprise a coating 22, shown in FIG. 2. The coating 22 can be utilized to prevent sticking of the food product to the grids, for example. The grids can further comprise heat sources 24, for example embedded heating elements or tubes 26 that allow passage of heated gases or liquids, or magnetic induction to heat the grids. As such, the upper heated grids and lower heated grids can be used to provide grill marks and cook both sides of the food product simultaneously via conduction. The upper heated grid and lower heated grid can be removable to facilitate cleaning of the charbroiler or changing the grids to griddles.

In the closed position, the upper heated grid 13 can be maintained a distance G away from the lower heated grid 16. In certain embodiments, the distance G is determined by the thickness of the food product 17 as the upper heated grid 13 rests on top of the food product 17 by gravity. In other instances, the distance G can be adjustable such that the distance G is greater than the thickness of food product 17 and upper heated grid 13 does not contact food product 17 or the distance G can be adjusted to less than the thickness of food product and the upper heated grid 13 contacts and compresses food product 17.

A preferred two-sided charbroiler of the present invention comprises heated grids with independently regulated heat sources which can, when desired, come in contact with the bottom surfaces of the food product being cooked and, optionally, the top surface. In a cooking method of the present invention, a food product can be first placed onto the lower heated grid, and then the upper heated grid can be moved to a predetermined position over the lower heated grid and in proximity of and/or contact with the top surface of the food product. In certain embodiments, the lower and upper heated grids can maintain an approximate parallel relationship during the cooking process and can be configured for a fixed or adjustable gap between the grids, when desired. The gap can be achieved by either placing a gap setting block between the mechanical structures of the upper and lower cooking surfaces, or by an adjustable means such as screw devices that are operated by a crank or motor to enforce a gap between the two sections while maintaining approximate parallelism. Achieving a defined gap between grids will produce grill marks on food items placed into the device that are thicker than the gap, sear in juices, and will aid in reducing the thickness variance of products cooked in the charbroiler.

If food products that are thinner than the gap between the heated grids are placed in the charbroiler, the top surface of the food product will not contact the upper heated grid and, therefore, may not have grill markings on both sides. Thus, setting the gap G between the upper and lower heated grids allows the user to operate the charbroiler in various configurations, such as a bottom heated charbroiler (if the top of the charbroiler is turned down or off), as a top heated broiler (if the bottom of the charbroiler is turned down or off), as a bottom grill with a top broiler (bottom turned on and top turned on without contacting top of food product), or as a dual charbroiler (bottom and top turned on with both sides of food product contacted by heated cooking grates).

The upper and lower heated grids can comprise dedicated, independent heaters that can be regulated to consistently mark and conduct heat into the food product being cooked.

The radiant heat is provided independently of the heat of the heated grids and can augment the heating of the grids as well as provide infrared heat for high temperature cooking. The radiant heaters also provide convective heat for cooking product exposed between the cooking grates. While radiant heaters for charbroilers and electric grills are known, the present radiant heaters can work independently and in concert with the independently regulated heated grids.

Embodiments of the invention are directed to a charbroiler, wherein the lower heated grid, the upper heated grid, the upper radiant heater, and the lower radiant heater each comprise an independently regulated heat source. The heat sources can be regulated manually or automatically. Each of the independently regulated heat sources 24 can be the same or different than the other heat sources and can be many types of heat sources capable of cooking a food product including, but not limited to, an electrical heat source, an infrared heat source, embedded electric rods, a microwave heat source, and gas fired heat source, for example. The gas fired heat source can be fueled by combustible gas including, but not limited to, methane, propane, butane, or natural gas, for example. For example, in one embodiment, the upper and lower heated grids can comprise embedded electrically heated rods and the upper and lower radiant heaters can be electrically heated rods or an infrared heat source. In another example, the upper and lower heated grids can comprise embedded electrically heated rods and the upper and lower radiant heaters can be gas burners. Other combinations of heating the grids and the radiant heaters have been contemplated and are considered within the scope of the invention.

Embodiments of the charbroiler can also comprise a cooking control system 30 capable of controlling each of independently regulated heat sources. The cooking control system can comprise an input means allowing selection of the food product to be cooked, the degree of cooking of the food product (rare, medium, well done, or various other degrees of doneness), the method of cooking, and the desired appearance of the food product. The input means can be a keyboard, keypad, mouse, touch screen, bottoms, or other input devices. The cooking control system can additionally have a screen that provides information concerning the food product, the temperatures of the various locations of the charbroiler, the distance between the lower and upper heated grids, the length of the cooking cycle, the time remaining in the cooking cycle, heat intensity setting of each independently regulated heat source, and other information concerning the settings and operation of the charbroiler. The screen can also provide information concerning preprogrammed cooking cycles for various food products.

The cooking control system can independently regulate each of independently regulated heat sources by adjusting the fuel supply to the heat source such as the controlling the supply of electricity or fuel to the heat source. The cooking control system can operate based upon preprogrammed cooking cycles or allow dynamic control of the cooking cycle based upon user input or input from various sensors built into the charbroiler. For example, the charbroiler can comprise independent temperature sensors for sensing the temperature of at least one of the upper heated grid, the lower heated grid, the upper radiant heater, and the lower radiant heater. In a preferred embodiment, the charbroiler comprises independent temperature sensors 32 for individually sensing the temperature of each the upper heated grid, the lower heated grid, the upper radiant heater, and the lower radiant heater. A temperature signal can be various types of signals, for example, electrical, mechanical, or pneumatic, that corresponds to a temperature reading of sensor. The temperature units can be in Fahrenheit, Celsius, Kelvin, for example, or can be a signal that indicates a relative change in temperature. The temperature sensors allow the cooking control system to determine the impact of each independent heat source on the overall cooking of the food product.

In such embodiments, the temperature control system is capable of being programmed for cooking different food products, such as steaks, pork chops, hamburgers, chicken pieces, hot dogs, turkey burgers, salmon patties, crab cakes, patties made from vegetable matter, or toasting bread, for example, and dynamically controlling the cooking process. The cooking control system can automatically regulate one or more of the available heat sources or adjust the cooking time to cook the food product, if necessary. The factors involved in the regulating the heat source can include, but are not limited to, the food product on the charbroiler, the desired degree of cooking, the thickness of the food product, the desired appearance of the finished food product and the gap between the heated grids, for example.

Preferably, the charbroiler of the invention is a two-sided charbroiler that employs independent temperature-controlled heated grids and independent temperature control above and below the food products being cooked. This allows both sides of the food to be browned and cooked simultaneously, with grill markings on both sides, if desirable, reduced in an efficient cooking cycle.

The charbroiler provides a method for cooking a food product comprising heating a food product and controlling the temperature of cooking grates precisely and independently, instead of as a byproduct of radiant heaters, as commonly found in conventional cooking technologies. Thus, the invention results in productivity and efficiency gains as opposed to flipping products on a conventional charbroiler, while also providing more uniform cooking, more uniform appearance with uniform grill markings, uniform color between markings, and uniform internal product temperatures than is possible with conventional cooking systems.

The cooking control system can include cooking cycles that include a target initial temperature for each heat source to be used to cook the food product. As the cooking cycle progresses, however, one or more of the independent heat sources can be regulated to produce the desired finished food product. For example, for cooking a hamburger, the cooking control system can adjust the upper heated grid and lower heated grid to a target initial temperature to cause "grill marks" to be cooked into the surface of the hamburger; however, after an initial period of time the heat source of the upper heated grid and the lower heated grid can be reduced or turned off. The cooking control system can similarly regulate the upper radiant heater and the lower radiant heater to cook the hamburger, or other food product, to the desired degree of completion. The cooking control system can comprise inputs for receiving a temperature signal from each of the temperature sensors to facilitate regulating the heat sources. In embodiments of the invention, the charbroiler comprises a cooking control system capable of adjusting the heat output of each of the independently regulated heat sources based upon the input of the temperature sensors. In a preferred embodiment of the charbroiler, the cooking control system is capable of adjusting the heat output of any one or more of the independently regulated heat sources based upon the input of the temperature sensors of any of the other independently regulated heat sources. The cooking control system can further be configured to continuously calculate and adjust the length of the cooking cycle based upon the inputs from the temperature sensors.

The heated grids and radiant heaters can be programmed to vary the temperature through the cooking process to facilitate food releasing from the grids, achieving correct marking and browning due to various product loads and atmospheric conditions, and the ability to perform a "self-cleaning" operation by achieving high temperatures of the grate and/or the radiant heaters as well as other reasons.

In a further embodiment, the cooking control system can determine a cooking factor for one or more of the available independently regulated heat sources or combination of heat sources. The cooking factor can be, for example, a factor comprising the amount of cooking to be completed by each of the independently controlled heat sources. By assigning a cooking factor to each independently regulated heat source, the cooking system can compensate for irregularities in the cooking cycle.

Throughout the cooking cycle a continuous reading or sample of specific points of key cooking components are monitored and a mathematical formula used to derive and monitor the "cooking factor" for each heat source. Variables in the cooking factor formula can be tuned for each cooking component's contribution to the cooking properties of the food product being processed as a function of the cooking cycle.

The cooking system calculates an instantaneous cooking factor for each heating component whether grid or radiant, "$Cf_c$" at time intervals throughout the cooking cycle based on the following formula:

$$CF_c = A\hat{}(B \times (TS_c - TR_c - TO_c)/PS_c) \quad (1)$$

wherein

A is a variable determined by experimentation for specific cooking conditions;

B is a variable determined by experimentation for specific cooking conditions;

$TS_c$ is the temperature sensed for a specific heating component;

$TR_c$ is a temperature reference point established by research for a specific heating component related to a specific food item and its corresponding cooking program;

$TO_c$ is a temperature offset for a specific heating component established by research to adjust sensed temperature to the temperature that is actually experienced by the food product; and $PS_c$ is a product sensitivity established by research that describes the impact of temperature variation of a specific heating component on the food product by a specific heating component.

For example, for a simple system for a charbroiler with only two radiant heaters and two heated cooking grids:

$CF_1$ calculates the cooking Factor the upper radiant heater;

$CF_2$ calculates the cooking Factor for the upper cooking grid;

$CF_3$ calculates the cooking Factor for the lower cooking grid; and $CF_4$ calculates the cooking Factor for the lower radiant heater.

It should be understood that embodiments of the cooking systems can have more or less heating components and cooking factors than shown in this example. A summation function can further be utilized to calculate the accumulated cooking factor for one or more of the cooking components from the beginning of the cook cycle to the current time in the cook cycle. Accumulated Cooking Factor, or $ACF_c$, is a summation of $CF_n$ that is updated throughout the cook cycle as follows:

$$ACF_c = \Sigma CFc \quad (2)$$

The $ACF_c$ for each component is compared against a target $ACF_c$ for that component at that time in the cooking cycle. The cooking system can adjust any or all of the heat input components to compensate for a difference in the $ACF_c$ such as by lowering the heat input of a heating component that has a $ACF_c$ above the target $ACF_c$ for that segment of the cooking cycle or the cooking system can raise the temperature of other heating components to compensate or individual heating component that has a $ACF_c$ above a target $ACF_c$ for that component during a specific segment of the cooking cycle, for example. Other compensation strategies are also available and are within the scope of the invention.

As the heat sources' accumulated cooking factors are calculated and compared, the lowest or highest performing component can be identified. All other heat sources can be controlled to try and achieve the same accumulated cooking quotient as the lowest or highest performing component by the end of the cooking cycle. For example, in response to a low performing heat source, the cooking control system can adjust the heat output of at least one independently regulated heat source based upon the $ACF_c$ or direct input of a temperature sensor indicating the temperature of low performing independently regulated heat source. For example, the heat output of one of the independently regulated heat source can be reduced based upon the $ACF_c$ or the input of a temperature sensor indicating the temperature of another independently regulated heat source is lower than the target temperature at any point in the cooking cycle. Further, a temperature sensor can indicate that the initial temperature of a heat source was lower than the target initial temperature or the upper section can be inadvertently lifted during the cooking cycle causing a reduction in the internal temperature of the charbroiler above the food product, the cooking control system will then regulate all necessary heat sources to contribute respectively to the desired cooking factor and produce a food product with the desired properties.

Similarly, the temperature of the heated grids can involve cooking compensation schemes to compensate for variances in actual temperatures experienced in the heated grid versus the target temperatures. Compensation can also include intentionally varying temperature of the grates in later portions of the cooking cycle to compensate for previous variations as well as varying the cooking time.

The temperature or heat output of the radiant heaters can also include dynamically controlled cooking compensation schemes to compensate for variances in actual temperatures sensed in the cooking process versus the target temperatures. Compensation can also include intentionally varying temperature of the grates in later portions of the cooking cycle to compensate for previous variations as well as varying the cooking time.

Temperature compensation for both heated grids and radiant heaters can employ non-linear mathematical functions, for example. Heating components of all heat sources including both the heated grids and the radiant heaters will at times vary from ideal settings during the cooking process. Throughout the cooking cycle, a continuous reading or a sample of specific points of key cooking components will be monitored and a mathematical formula used to derive a "cooking factor" for each key component. Variables in the cooking factor formula will be tuned for each cooking component's contribution to the cooking properties of the food product being processed as a function of the cooking cycle.

As an example, if a heated grid is 50 degrees too hot at the beginning of the cook cycle, the formula will determine the impact of that overage on the cooking of the food product expressed in terms of the normative process, for example, 120% (this determination can be formula specific for each food product as a function and can be analyzed throughout the entire cooking process). As the product has cooked for some time, the same overshoot of 50 degrees can contribute more to the browning or heat absorption of the food product and result in a higher cooking quotient at a later time, for example, 135%.

A summation function will be utilized to calculate an "accumulated cooking factor" for each cooking component from the beginning of the cook cycle to the current time in the cook cycle. As all cooking components' accumulated cooking quotients are tallied, the lowest performing component will be identified. All other elements will be controlled to try and achieve the same accumulated cooking quotient as the lowest performing element by the end of the cooking cycle.

Cooking time can also be compensated dynamically (in real-time) throughout the entire cooking process, preferably based upon a non-linear algorithm utilizing accumulated cooking factors of key heater and grill components. A chief use for the device is to achieve a grilling effect on both sides of a food product simultaneously to promote productivity and reduce variance of the taste, texture, appearance, and food safety of the item being cooked. However, the lower cooking surface can be used as a conventional, single-sided grill, or the top elements can be used to duplicate an over broiler, or some combination of the two without grilling the top surface.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A charbroiler comprising:
    an upper heated grilling grate; and
    a lower heated grilling grate;
    the upper heated grilling grate and the lower heated grilling grate each comprising a plurality of thermally conductive members, at least a portion of the conductive members heated by an embedded heat source running at least approximately parallel with the conductive members;
    an upper radiant heater positioned above the upper grilling surface to provide radiant heat between the conductive members of the lower heated grilling grate; and
    a lower radiant heater positioned below the lower heated grilling grate to provide radiant heat between the conductive members of the lower heated grilling grate;
    wherein the upper heated grilling grate, the lower heated grilling grate, the upper radiant heater, and the lower radiant heater each comprise an independently regulated heat source.

2. The charbroiler of claim 1,
    at least a portion of the conductive members heated by embedded electric resistive heating running at least approximately parallel with the conductive members.

3. The charbroiler of claim 2, wherein the electric resistive heating is located fully within the at least a portion of the conductive members of the lower heated grilling grate.

4. The charbroiler of claim 1, further comprising a cooking control system for controlling the temperature of the upper heated grilling grate, the lower heated grilling grate, the upper radiant heater, and the lower radiant heater.

5. The charbroiler of claim 4, wherein the cooking control system operates based upon pre-programmed cooking cycles.

6. The charbroiler of claim 4, wherein the cooking control system provides dynamic control of a cooking cycle based upon user input or input from various sensors built into the charbroiler.

7. The charbroiler of claim 4, wherein the cooking control determines a cooking factor for one or both of the upper grilling surface and the lower heated grilling grate.

8. A clamshell charbroiler for cooking a food product comprising:
    an upper heated grilling grate comprising multiple thermally conductive members located on a common plane, the conductive members creating grilling marks on an upper surface of a food product;
    a lower heated grilling grate comprising multiple thermally conductive members located on a common plane, the conductive members heated by embedded electric resistive heating and creating grilling marks on a lower surface of the food product;
    an upper radiant heater positioned above the upper heated grilling grate to provide radiant heat to, and between, the thermally conductive members of the upper heated grilling grate to assist in browning the food product; and
    a lower radiant heater positioned below the lower heated grilling grate to provide radiant heat to, and between, the thermally conductive members of the lower heated grilling grate to assist in browning the food product;
    wherein the upper heated grilling grate, the lower heated grilling grate, the upper radiant heater, and the lower radiant heater each comprise an independently regulated heat source.

9. The clamshell charbroiler of claim 8, wherein the charbroiler creates grilling marks on the upper and lower surfaces of the food product simultaneously, while also simultaneously browning the food product between the thermally conductive members of the heated grilling grates.

10. The clamshell charbroiler of claim 8, wherein the radiant heaters further provide convective heat, the convective and radiant heat from the radiant heaters assisting to cook and brown the food product.

11. The charbroiler of claim 8, wherein the heat output of any one of the independently regulated heat sources is adjustable based upon the temperature of any of the other independently regulated heat sources.

12. The charbroiler of claim 8, wherein the cooking time of the food product is based upon the temperature of the independently regulated heat sources.

13. The charbroiler of claim 8, further comprising:
    an upper section comprising the upper radiant heater; and
    a lower section comprising the lower radiant heater, wherein the upper section is hinged to the lower section.

14. The charbroiler of claim 8, wherein the grilling grates comprise a material selected from the group consisting of cast iron, aluminum, stainless steel, ceramics, and combinations thereof.

15. The charbroiler of claim 8, wherein the grilling grates comprise a coating.

16. The charbroiler of claim 8, wherein the electric resistive heating is at least partially inside at least a portion of the lower heated grilling grate.

17. The charbroiler of claim 8, wherein the electric resistive heating is located fully within at least a portion of the lower heated grilling grate.

18. A clamshell charbroiler for cooking a food product comprising:
- an upper heated grilling grate comprising multiple thermally conductive members located on a common plane, the conductive members heated by embedded electric resistive heating and creating grilling marks on an upper surface of a food product by providing conductive heat;
- a lower heated grilling grate comprising multiple thermally conductive members located on a common plane, the conductive members heated by embedded electric resistive heating and creating grilling marks on a lower surface of the food product by providing conductive heat;
- an upper radiant heater positioned above the upper heated grilling grate to provide radiant heat between the thermally conductive members of the upper heated grilling grate to assist in browning the food product; and
- a lower radiant heater positioned below the lower heated grilling grate to provide radiant heat between the thermally conductive members of the lower heated grilling grate to assist in browning the food product;
- wherein an upper section of the clamshell charbroiler including the upper radiant heater and a lower section of the clamshell charbroiler including the lower radiant heater are hinged together;
- wherein the upper heated grilling grate, the lower heated grilling grate, the upper radiant heater, and the lower radiant heater each comprise an independently regulated heat source;
- wherein the charbroiler creates grilling marks on the upper and lower surfaces of the food product simultaneously, while also simultaneously browning the food product between the thermally conductive members of the heated grilling grates;
- wherein the radiant heaters further provide convective heat, the convective and radiant heat from the radiant heaters assisting to cook and brown the food product;
- wherein the heat output of any one of the independently regulated heat sources is adjustable based upon the temperature of any of the other independently regulated heat sources; and
- wherein the cooking time of the food product is based upon the temperature of the independently regulated heat sources.

* * * * *